(12) United States Patent
Shani et al.

(10) Patent No.: US 11,314,809 B2
(45) Date of Patent: Apr. 26, 2022

(54) SYSTEM AND METHOD FOR GENERATING COMMON METADATA POINTERS

(71) Applicant: EMC IP Holding Company, LLC, Hopkinton, MA (US)

(72) Inventors: Nimrod Shani, Raanana (IL); Amir Kredi, Raanana (IL)

(73) Assignee: EMC IP HOLDING COMPANY, LLC, Hopkinton, MA (US)

(*) Notice: Subject to any disclaimer, the term of this patent is extended or adjusted under 35 U.S.C. 154(b) by 274 days.

(21) Appl. No.: 16/261,957

(22) Filed: Jan. 30, 2019

(65) Prior Publication Data
US 2020/0242165 A1  Jul. 30, 2020

(51) Int. Cl.
  *G06F 16/00* (2019.01)
  *G06F 16/901* (2019.01)
  *G06F 16/182* (2019.01)

(52) U.S. Cl.
  CPC ...... *G06F 16/9024* (2019.01); *G06F 16/1827* (2019.01)

(58) Field of Classification Search
  CPC .. G06F 11/1435; G06F 12/0253; G06F 12/10; G06F 16/9024; G06F 16/1827
  USPC .......................................................... 707/800
  See application file for complete search history.

(56) References Cited

U.S. PATENT DOCUMENTS

2016/0070480 A1* 3/2016 Babu .................... G06F 3/0665
                                                                711/114
2016/0371295 A1* 12/2016 Aronovich ........... G06F 16/162

* cited by examiner

*Primary Examiner* — Chelcie L Daye
(74) *Attorney, Agent, or Firm* — Brian J. Colandreo; Mark H. Whittenberger; Holland & Knight LLP

(57) ABSTRACT

A method, computer program product, and computing system for identifying one or more first layer metadata blocks with a plurality of entries mapping to a plurality of entries of one or more second layer metadata blocks. The one or more second layer metadata blocks mapped to by the one or more first layer metadata blocks may be identified. A common back pointer for at least a subset of the plurality of entries of the one or more second layer metadata blocks may be generated, the common back pointer pointing from the at least a subset of the plurality of entries of the one or more second layer metadata blocks to the one or more first layer metadata blocks.

18 Claims, 11 Drawing Sheets

SYSTEM AND METHOD FOR GENERATING COMMON METADATA POINTERS

BACKGROUND

Storing and safeguarding electronic content may be beneficial in modern business and elsewhere. Accordingly, various methodologies may be employed to protect and distribute such electronic content. However, as data accumulates and is modified in storage systems, various procedures may be necessary to reorganize or cleanup the data to maintain acceptable latency. For example, modern log structure systems generally employ garbage collection to create empty chunks to store user data. This process may generally include user data relocation which may unfortunately create fragmentation for metadata blocks that map to the user data. As such, latency associated with retrieving data from the storage system may increase.

SUMMARY OF DISCLOSURE

In one example implementation, a computer-implemented method executed on a computing device may include but is not limited to identifying one or more first layer metadata blocks with a plurality of entries mapping to a plurality of entries of one or more second layer metadata blocks. The one or more second layer metadata blocks mapped to by the one or more first layer metadata blocks may be identified. A common back pointer for at least a subset of the plurality of entries of the one or more second layer metadata blocks may be generated, the common back pointer pointing from the at least a subset of the plurality of entries of the one or more second layer metadata blocks to the one or more first layer metadata blocks.

One or more of the following example features may be included. The plurality of entries of the one or more second layer metadata blocks may map to a plurality of entries of one or more third layer metadata blocks and wherein the plurality of entries of the one or more third layer metadata blocks may be configured to store user data. Generating the common back pointer may be in response to adding new user data to the one or more third layer metadata blocks. One or more entries of the one or more third layer metadata blocks may be deleted. One or more entries mapping to the one or more deleted entries of the one or more third layer metadata blocks may be deleted from the at least a subset of the plurality of entries of the one or more second layer metadata blocks. The common back pointer for the at least a subset of the plurality of entries of the one or more second layer metadata blocks may be retained. The subset of the plurality of entries of the one or more second layer metadata blocks may include at least two entries of the one or more second layer metadata blocks. Each entry of the plurality of entries of the one or more first layer metadata blocks may be associated with a Logical Block Address (LBA) range. A second layer metadata block may be defragmented to define a new location for at least one entry of the second layer metadata block. For each entry of the one or more entries of the first layer metadata block pointed to by a pointer from the one or more entries of the second layer metadata block, it may be determined if the entry of the first layer metadata block maps to the new location for the at least one entry of the second layer metadata block, and if the entry of the first layer metadata block does not map to the new location for the at least one entry of the second layer metadata block, the entry of the first layer metadata may be updated to map to the new location of the at least one entry of the second layer metadata block. For each pointer pointing from the one or more entries of the second layer metadata block: it may be determined if any of the one or more entries of the first layer metadata block and the one or more entries of the second layer metadata block point to each other, and a pointer from the second layer metadata block may be removed if none of the one or more entries of the first layer metadata block point to the one or more entries from which the pointer points from.

In another example implementation, a computer program product resides on a computer readable medium that has a plurality of instructions stored on it. When executed by a processor, the instructions cause the processor to perform operations that may include but are not limited to identifying one or more first layer metadata blocks with a plurality of entries mapping to a plurality of entries of one or more second layer metadata blocks. The one or more second layer metadata blocks mapped to by the one or more first layer metadata blocks may be identified. A common back pointer for at least a subset of the plurality of entries of the one or more second layer metadata blocks may be generated, the common back pointer pointing from the at least a subset of the plurality of entries of the one or more second layer metadata blocks to the one or more first layer metadata blocks.

One or more of the following example features may be included. The plurality of entries of the one or more second layer metadata blocks may map to a plurality of entries of one or more third layer metadata blocks and wherein the plurality of entries of the one or more third layer metadata blocks may be configured to store user data. Generating the common back pointer may be in response to adding new user data to the one or more third layer metadata blocks. One or more entries of the one or more third layer metadata blocks may be deleted. One or more entries mapping to the one or more deleted entries of the one or more third layer metadata blocks may be deleted from the at least a subset of the plurality of entries of the one or more second layer metadata blocks. The common back pointer for the at least a subset of the plurality of entries of the one or more second layer metadata blocks may be retained. The subset of the plurality of entries of the one or more second layer metadata blocks may include at least two entries of the one or more second layer metadata blocks. Each entry of the plurality of entries of the one or more first layer metadata blocks may be associated with a Logical Block Address (LBA) range. A second layer metadata block may be defragmented to define a new location for at least one entry of the second layer metadata block. For each entry of the one or more entries of the first layer metadata block pointed to by a pointer from the one or more entries of the second layer metadata block, it may be determined if the entry of the first layer metadata block maps to the new location for the at least one entry of the second layer metadata block, and if the entry of the first layer metadata block does not map to the new location for the at least one entry of the second layer metadata block, the entry of the first layer metadata may be updated to map to the new location of the at least one entry of the second layer metadata block. For each pointer pointing from the one or more entries of the second layer metadata block: it may be determined if any of the one or more entries of the first layer metadata block and the one or more entries of the second layer metadata block point to each other, and a pointer from the second layer metadata block may be removed if none of the one or more entries of the first layer metadata block point to the one or more entries from which the pointer points from.

In another example implementation, a computing system includes at least one processor and at least one memory architecture coupled with the at least one processor, wherein the computing system is configured to perform operations that may include but are not limited to identifying one or more first layer metadata blocks with a plurality of entries mapping to a plurality of entries of one or more second layer metadata blocks. The one or more second layer metadata blocks mapped to by the one or more first layer metadata blocks may be identified. A common back pointer for at least a subset of the plurality of entries of the one or more second layer metadata blocks may be generated, the common back pointer pointing from the at least a subset of the plurality of entries of the one or more second layer metadata blocks to the one or more first layer metadata blocks.

One or more of the following example features may be included. The plurality of entries of the one or more second layer metadata blocks may map to a plurality of entries of one or more third layer metadata blocks and wherein the plurality of entries of the one or more third layer metadata blocks may be configured to store user data. Generating the common back pointer may be in response to adding new user data to the one or more third layer metadata blocks. One or more entries of the one or more third layer metadata blocks may be deleted. One or more entries mapping to the one or more deleted entries of the one or more third layer metadata blocks may be deleted from the at least a subset of the plurality of entries of the one or more second layer metadata blocks. The common back pointer for the at least a subset of the plurality of entries of the one or more second layer metadata blocks may be retained. The subset of the plurality of entries of the one or more second layer metadata blocks may include at least two entries of the one or more second layer metadata blocks. Each entry of the plurality of entries of the one or more first layer metadata blocks may be associated with a Logical Block Address (LBA) range. A second layer metadata block may be defragmented to define a new location for at least one entry of the second layer metadata block. For each entry of the one or more entries of the first layer metadata block pointed to by a pointer from the one or more entries of the second layer metadata block, it may be determined if the entry of the first layer metadata block maps to the new location for the at least one entry of the second layer metadata block, and if the entry of the first layer metadata block does not map to the new location for the at least one entry of the second layer metadata block, the entry of the first layer metadata may be updated to map to the new location of the at least one entry of the second layer metadata block. For each pointer pointing from the one or more entries of the second layer metadata block: it may be determined if any of the one or more entries of the first layer metadata block and the one or more entries of the second layer metadata block point to each other, and a pointer from the second layer metadata block may be removed if none of the one or more entries of the first layer metadata block point to the one or more entries from which the pointer points from.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
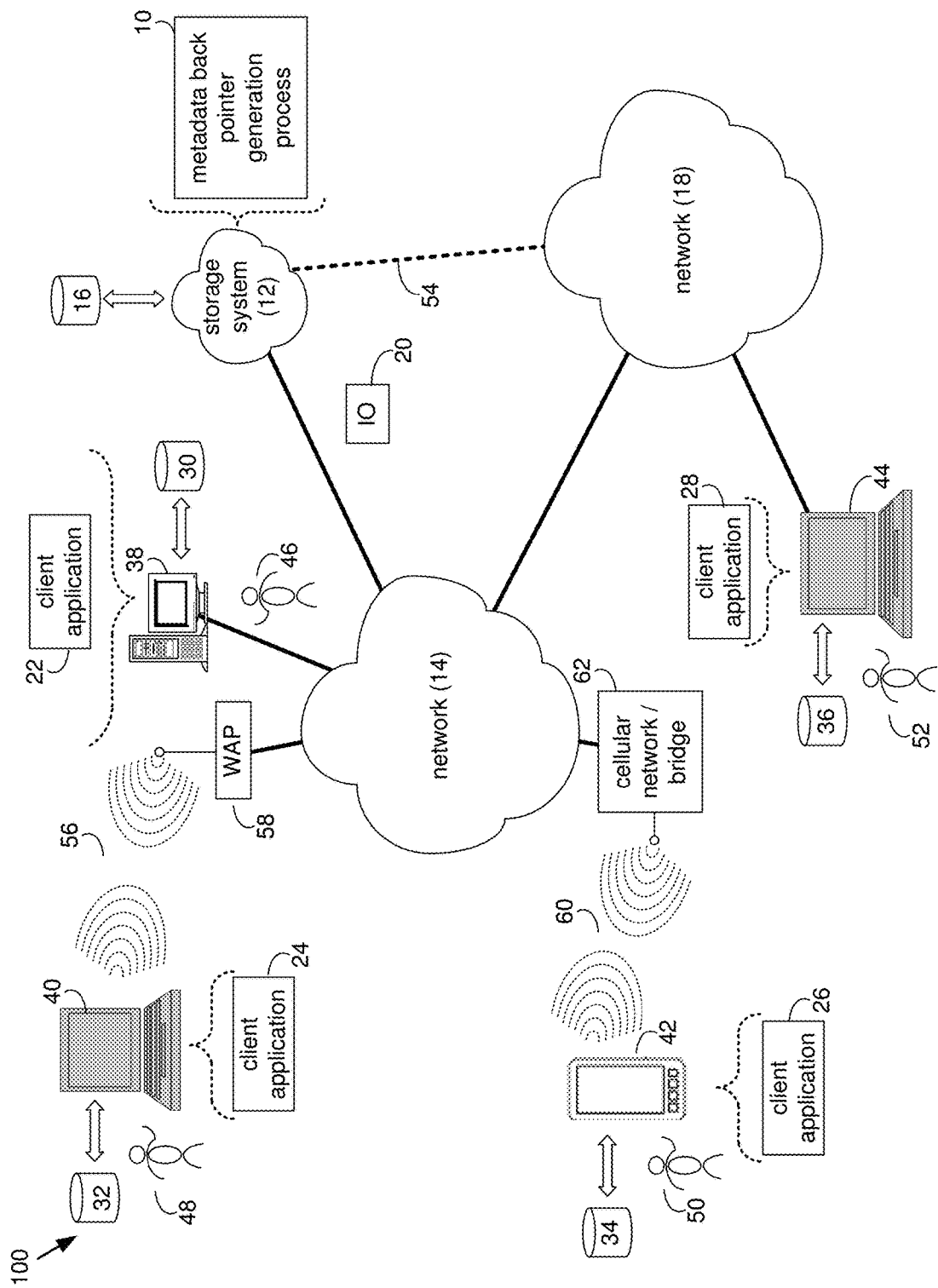
FIG. 1 is an example diagrammatic view of a storage system and a metadata back pointer generation process coupled to a distributed computing network according to one or more example implementations of the disclosure.

System Overview:

Referring to FIG. 1, there is shown metadata back pointer generation process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of metadata back pointer generation process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of metadata back pointer generation process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a process, such as metadata back pointer generation process 10 of FIG. 1, may include but is not limited to, identifying one or more first layer metadata blocks with a plurality of entries mapping to a plurality of entries of one or more second layer metadata blocks. The one or more second layer metadata blocks mapped to by the one or more first layer metadata blocks may be identified. A common back pointer for at least a subset of the plurality of entries of the one or more second layer metadata blocks may be generated, the common back pointer pointing from the at least a subset of the plurality of entries of the one or more second layer metadata blocks to the one or more first layer metadata blocks.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
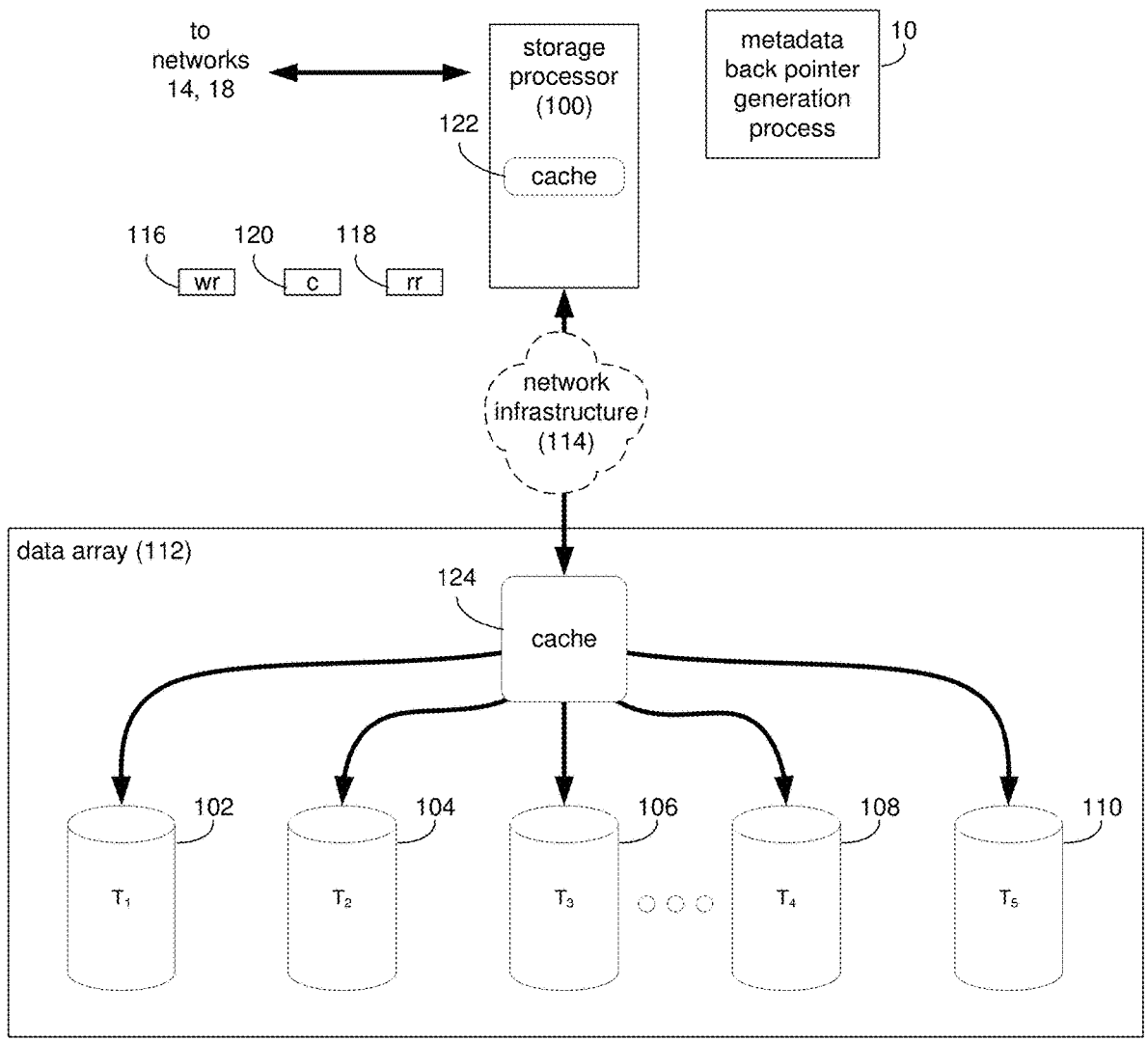
FIGS. 2-3 are example diagrammatic views of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/ performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/ performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of metadata back pointer generation process 10. The instruction sets and subroutines of metadata back pointer generation process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of metadata back pointer generation process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of metadata back pointer generation process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of metadata back pointer generation process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

Metadata Architecture:

In the context of storage systems, metadata may generally include useful internal information managed by a storage array to describe and locate user data. All modern arrays abstract the physical media and present logical (virtualized) addresses to clients in the form of LUNs. The mapping between the logical address and physical address is a form of metadata that the array needs to manage. That's typically the most common form of metadata for SAN storage systems. Newer architectures manage additional metadata to implement additional capabilities. For example, snapshots, change tracking for efficient remote replication, deduplication pointers, and compression all involve managing some form of metadata.

The classic metadata structure of traditional storage systems directly links a Logical Address of a Block to the Physical Location of the Block. In this metadata structure, every logical block written, has a physical block linked directly to it. In addition, as most traditional storage systems were architected for a spinning disk storage medium optimized for sequential writes the address of the logical address affects the physical location that the data is stored. This can lead to an unbalanced storage array that can suffer from hot-spots as specific address space ranges may experience more performance/IOPs than other address space ranges.

Embodiments of the present disclosure may support a flash/random access medium. For example, embodiments of the present disclosure may include a metadata structure that completely decouples the Logical Block Address space address from the physical one. This is done by leveraging a multi-layer architecture.

Figure 3:
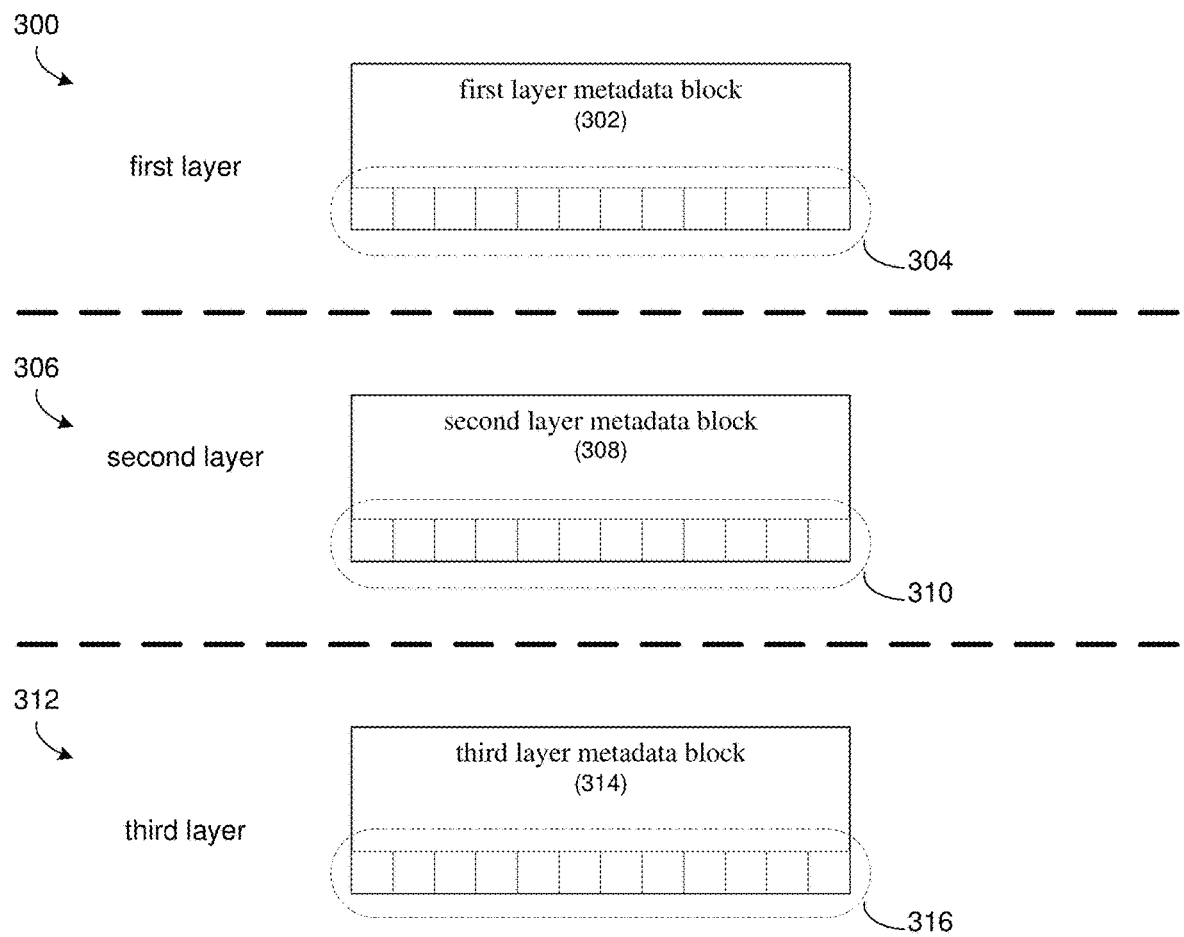
Figure 4:
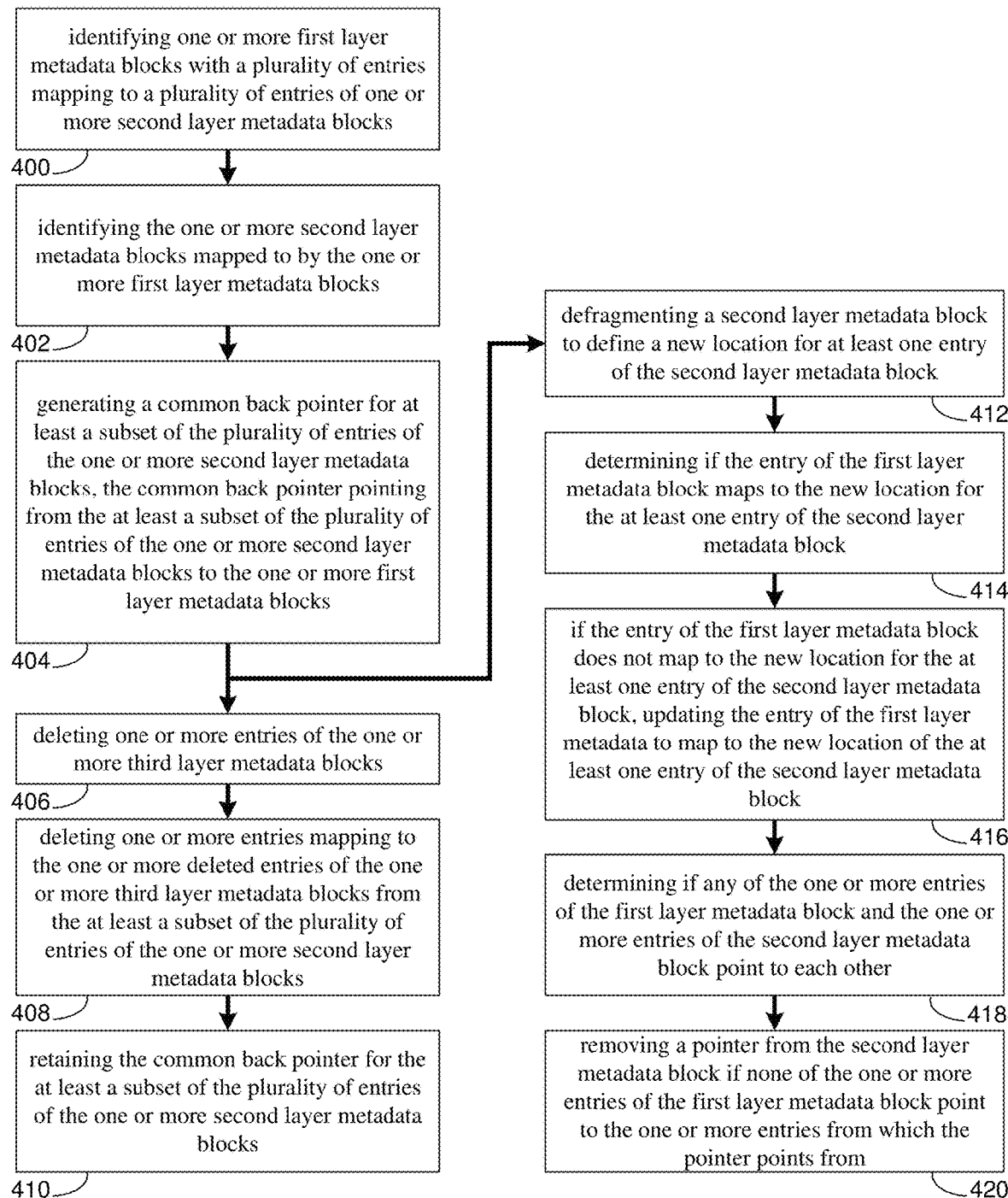
FIG. 4 is an example flowchart of the metadata back pointer generation process of FIG. 1 according to one or more example implementations of the disclosure.
Figure 5:
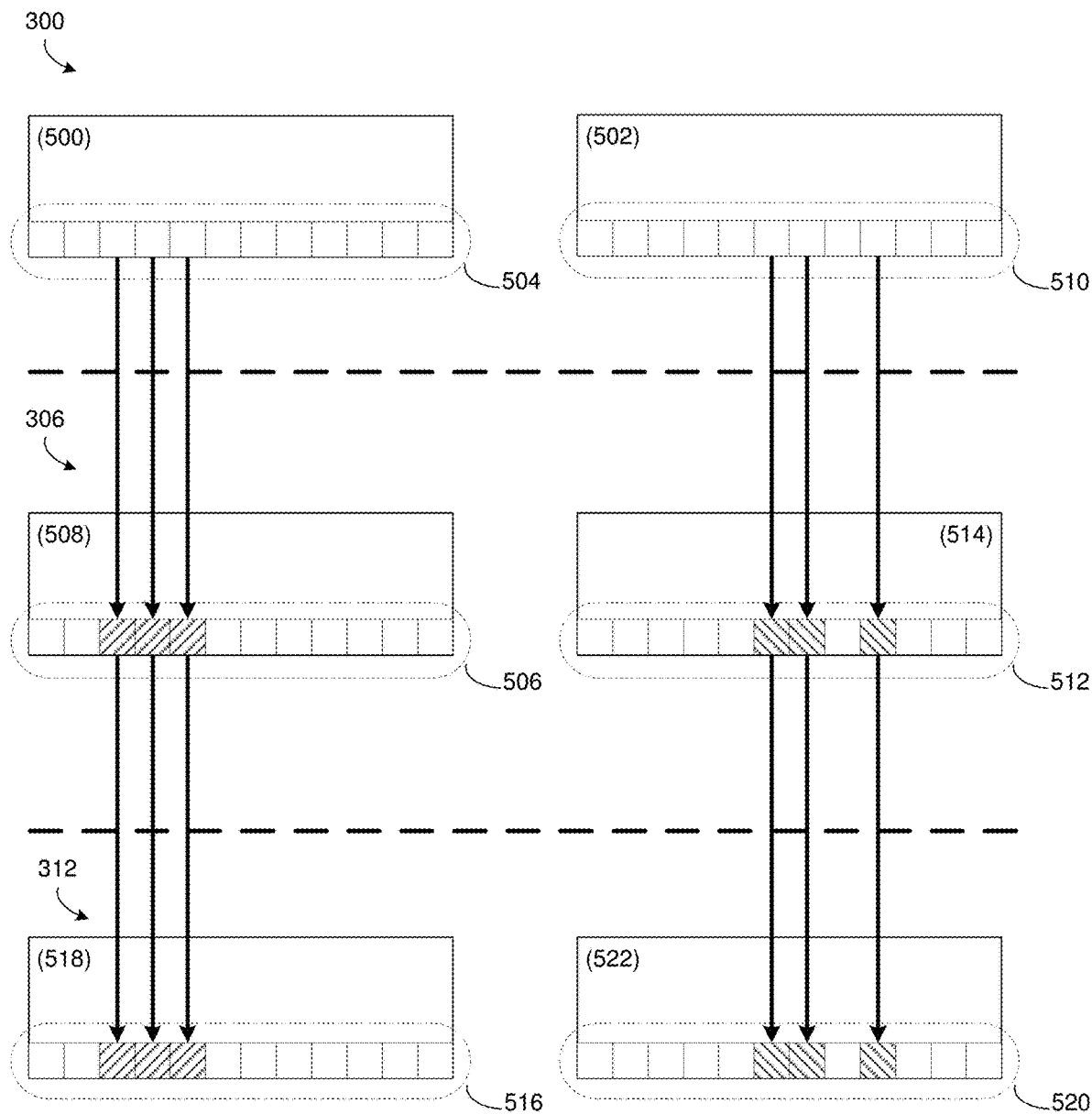
FIGS. 5-11 are example diagrammatic views of the metadata back pointer generation process of FIG. 1 according to one or more example implementations of the disclosure.

Referring also to FIG. 3, a storage system may generally include three layers of metadata blocks. While the following example includes metadata "blocks", it will be appreciated that other units of data storage may be used within the scope of the present disclosure. In some implementations, a first layer (e.g., first layer 300) may include first layer metadata blocks (e.g., first layer metadata block 302) with a plurality of entries (e.g., plurality of entries 304) that map or point to a plurality of entries of one or more second layer metadata blocks. The first layer may (e.g., first layer 300) represent various ranges of Logical Block Addresses (LBAs). For example, each entry of the plurality of entries (e.g., plurality of entries 304) of the first layer metadata blocks (e.g., first layer metadata block 302) may be associated with a LBA range. In some implementations, the first layer (e.g., first layer 300) may be organized in a "tree" data structure where each "leaf" of the "tree" data structure corresponds to a specific LBA range. Accordingly, each first layer metadata block (e.g., first layer metadata block 302) may hold mapping of a LBA to a second layer metadata block. It will be appreciated that other data structures may be used within the scope of the present disclosure to organize the first layer.

In some implementations, a second layer (e.g., second layer 306) may include second layer metadata blocks (e.g., second layer metadata block 308) with a plurality of entries (e.g., plurality of entries 310) that map to a plurality of entries of one or more third layer metadata blocks. The second layer (e.g., second layer 306) may generally isolate the logical address of a block from the physical location of the block. For example, a second layer metadata block (e.g., second layer metadata block 308) may encapsulate the physical location of user data and allow relocation without updating first layer metadata blocks (e.g., first layer metadata block 302). Accordingly, the second layer (e.g., second layer 306) may decouple the Logical Block Address space address from the physical one.

In some implementations, one or more entries (e.g., entries 304) of the first layer metadata block (e.g., first layer metadata block 302) may point or map to the same entries (e.g., entries 310) of the second layer metadata block (e.g., second layer metadata block 308). In some implementations, this configuration may be referred to as deduplication.

In some implementations, a third layer (e.g., third layer 312) may include third layer metadata blocks (e.g., third layer metadata block 314) with a plurality of entries or portions (e.g., plurality of entries 316) that are configured to store user data. In this manner, the third layer (e.g., third layer 312) may describe the physical location of user data in a storage system. In some implementations, each third layer metadata block (e.g., third layer metadata block 314) may also be referred to as a metadata page and may have a predefined amount of storage capacity (e.g., 4 kilobytes) for storing metadata (e.g., user data). As will be discussed in greater detail below, third layer metadata blocks (e.g., third layer metadata block 314) may be stored in a storage array (e.g., on one of storage targets 102, 104, 106, 108 of storage array 112). While the third layer metadata block is referred herein as a "metadata block" for purposes of describing relationships between the three layers in the metadata architecture, the blocks of the third layer (e.g., third layer metadata block 314) may be configured to store user data as opposed to the blocks of the first and/or second layers that may store metadata describing the location of the user data in the third layer.

The Metadata Back Pointer Generation Process:

Referring also to FIGS. 4-11 and in some implementations, metadata back pointer generation process 10 may identify 400 one or more first layer metadata blocks with a plurality of entries mapping to a plurality of entries of one or more second layer metadata blocks. The one or more second layer metadata blocks mapped to by the one or more first layer metadata blocks may be identified 402. A common back pointer for at least a subset of the plurality of entries of the one or more second layer metadata blocks may be generated 404, the common back pointer pointing from the at least a subset of the plurality of entries of the one or more second layer metadata blocks to the one or more first layer metadata blocks.

As will be discussed in greater detail below, as data accumulates and is modified in storage systems, various procedures may reorganize or cleanup the data to maintain acceptable latency. For example, modern log structure systems generally employ garbage collection processes to create empty chunks to store user data. These processes may generally include user data relocation which may unfortunately create fragmentation for metadata blocks that map to the user data. Further, conventional approaches to multi-layer metadata architecture specify that each entry of a second layer metadata block maps or points to an entry of a first layer metadata block. These pointers are typically called "back pointers". However, such back pointers from each entry of the second layer metadata block to an entry of a first layer metadata block may double the metadata layout size and reduce the compression rate of the storage system. As such, latency associated with retrieving data from the storage system may increase. As will be discussed in greater detail below, embodiments of the present disclosure may reduce the computational cost of back pointers from the second layer metadata block by employing common back pointers to point or map to first layer metadata blocks generally.

In some implementations, metadata back pointer generation process 10 may identify 400 one or more first layer metadata blocks with a plurality of entries mapping to a plurality of entries of one or more second layer metadata blocks. Referring also to the example of FIG. 5 and in some implementations, metadata back pointer generation process 10 may identify first layer metadata blocks 500, 502 in the first metadata layer 300 (as discussed in FIG. 3). In this example, metadata back pointer generation process 10 may identify 400 that one or more entries (e.g. entries 504) of first layer metadata block 500 map to entries (e.g., entries 506) of second layer metadata block 508 and one or more entries (e.g., entries 510) of first layer metadata block 502 map to entries (e.g., entries 512) of second layer metadata block 514.

In some implementations, metadata back pointer generation process 10 may identify 402 the one or more second layer metadata blocks mapped to by the one or more first layer metadata blocks. Referring again to the example of FIG. 5 and in some implementations, metadata back pointer generation process 10 may identify 402 second layer metadata block 508 and second layer metadata block 514. In some implementations, metadata back pointer generation process 10 may determine that one or more entries (e.g., entries 506) of second layer metadata block 508 map or point to one or more entries (e.g., entries 516) of third layer metadata block 518 and that one or more entries (e.g., entries 512) of second layer metadata block 514 map or point to one or more entries (entries 520) of third layer metadata block 522.

In some implementations, metadata back pointer generation process 10 may generate 404 a common back pointer for at least a subset of the plurality of entries of the one or more second layer metadata blocks, the common back pointer pointing from the at least a subset of the plurality of entries of the one or more second layer metadata blocks to the one or more first layer metadata blocks. Referring also to the example of FIG. 6 and in some implementations, metadata back pointer generation process 10 may generate a back pointer (e.g. as shown by the arrow) between subset of the plurality of entries (e.g., subset of entries 600) of second layer metadata block 508 and first layer metadata block 500. While an example with three entries in the subset of the plurality of entries has been described, it will be appreciated that any number of entries within a second layer metadata block may define a subset. For example and in some implementations, a subset of the plurality of entries of the one or more second layer metadata blocks may include at least two entries of a second layer metadata block. It will also be appreciated that numerous subsets of entries may be defined within a particular second layer metadata block. From the example of FIG. 6, metadata back pointer generation process 10 may generate the back pointer between a subset of the entries (e.g., subset of entries 600) of second layer metadata block 508 and first layer metadata block 500 generally. Accordingly, metadata back pointer generation process 10 may generate a back pointer from a subset of entries of a second layer metadata block to a first layer metadata block generally as opposed to conventional storage systems which may create back pointers between each entry second layer metadata block and individual entries of a first layer metadata block. In this manner, metadata back pointer generation process 10 may reduce the number of back pointers generated in a storage system.

Figure 6:
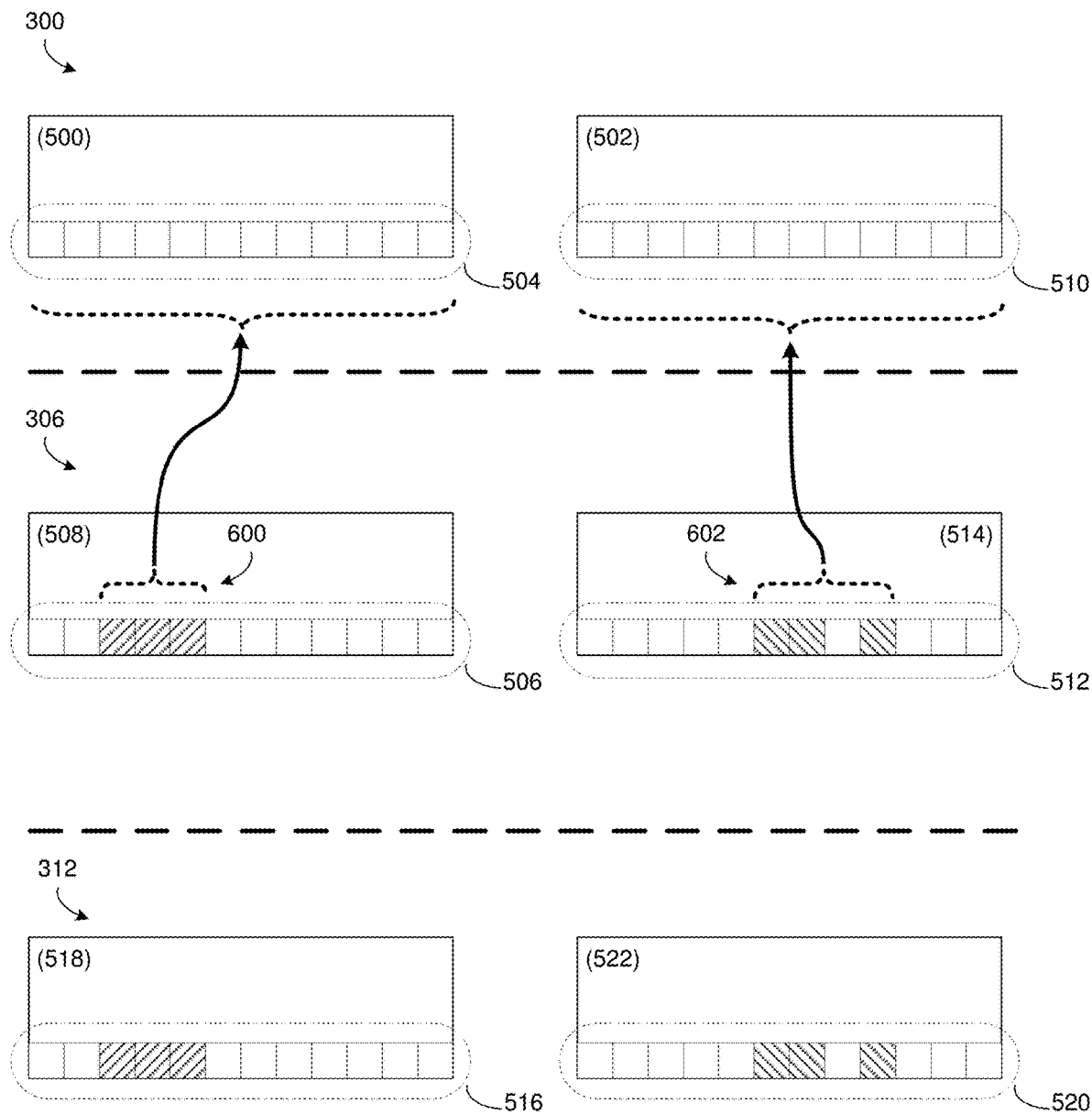
Figure 7:
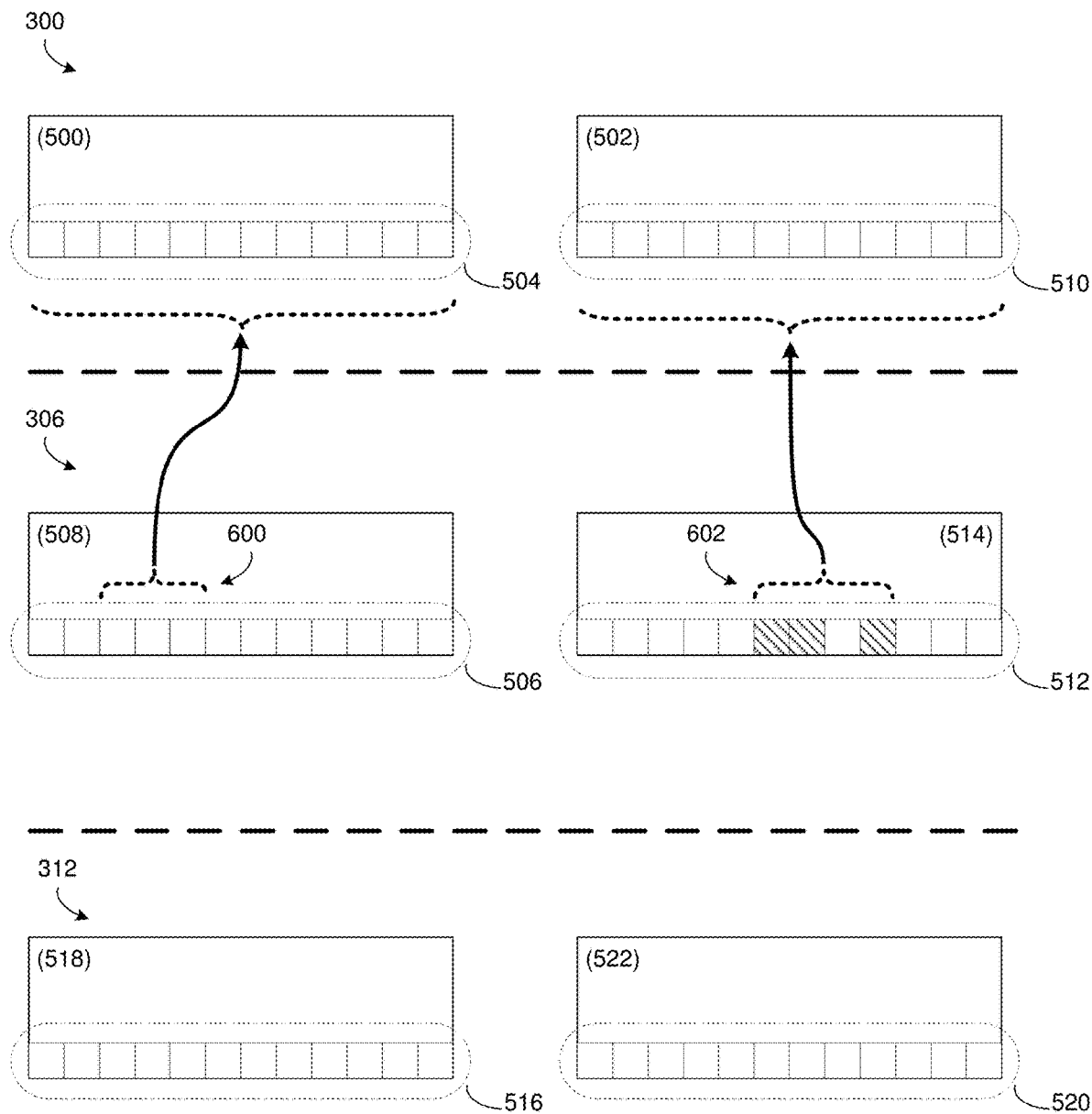

In another example and as shown in FIG. 6, metadata back pointer generation process 10 may generate a common back pointer from subset of entries 602 of second layer metadata block 514 pointing to first layer metadata block 502. Note that in this example, non-contiguous entries or portions of a second layer metadata block may define a subset of entries. Accordingly, the subset of entries may include any portion of entries of a second layer metadata block that map to the same first layer metadata block.

In some implementations, generating 404 the common back pointer is in response to adding new user data to the one or more third layer metadata blocks. Referring again to the example of FIG. 5 and in some implementations, metadata back pointer generation process 10 may receive a write request and add new user data to a third layer metadata block. For example, metadata back pointer generation process 10 may write new user data to one or more entries or portions of third layer metadata block 518 (e.g., three entries in third layer metadata block). Metadata back pointer generation process 10 may generate pointers from second layer metadata block 508 to third layer metadata block 518 and from first layer metadata block 500 to second layer metadata block 508. Referring also to FIG. 6, metadata back pointer generation process 10 may determine if the one or more entries (e.g., subset of entries 600) of second layer metadata block 508 include a common back pointer mapping to first metadata block 500. If metadata back pointer generation process 10 determines that the subset of entries of a second layer metadata block already includes a common back pointer pointing to a first metadata block, then metadata back pointer generation process 10 does not need to generate 404 a common back pointer. In some implementations, metadata back pointer generation process 10 may determine that one or more entries (e.g., subset of entries 600) of second layer metadata block 508 do not include a common back pointer mapping to first metadata block 500. In this example, metadata back pointer generation process 10 may generate 404 a common back pointer pointing from the subset of entries 600 of second layer metadata block 508 to first layer metadata block 500.

In some implementations, metadata back pointer generation process 10 may delete one or more back pointers based upon, at least in part, the mapping of the first layer metadata block. As will be discussed in greater detail below, metadata back pointer generation process 10 may account for common back pointers when deleting entries of a second layer metadata block. For example, in response to a command to delete (e.g., in response to a user command, defragmentation operation, etc.) certain user data, metadata back pointer generation process 10 may delete 406 one or more entries of the one or more third layer metadata blocks. Referring to the example of FIG. 7 and in some implementations, metadata back pointer generation process 10 may delete 406 the e.g., three entries from third layer metadata block 518 pointed to by second layer metadata block 508.

In some implementations, metadata back pointer generation process 10 may delete 408 one or more entries mapping to the one or more deleted entries of the one or more third layer metadata blocks from the at least a subset of the plurality of entries of the one or more second layer metadata blocks. Referring again to the example of FIG. 7 and in some implementations, metadata back pointer generation process 10 may delete 408 the e.g., three entries of the subset of entries that map or point to the one or more deleted entries of the one or more third layer metadata blocks (e.g., the three entries of the third layer metadata block).

In some implementations, metadata back pointer generation process 10 may retain 410 the common back pointer for the at least a subset of the plurality of entries of the one or more second layer metadata blocks. Referring again to the example of FIG. 7 and in some implementations, metadata back pointer generation process 10 may be unable to determine whether a back pointer or back pointers associated with the deleted entries of second layer metadata block 508 is/are common back pointers. Accordingly and as will be discussed in greater detail below, metadata back pointer generation process 10 may retain 410 the common back pointer until a defragmentation process clears the back pointers. In this manner, metadata back pointer generation process 10 may retain 410 the back pointer between second layer metadata block 508 and first layer metadata block 500.

In some implementations, metadata back pointer generation process 10 may defragment 412 a second layer metadata block to define a new location for at least one entry of the second layer metadata block. As is known in the art, defragmentation may include the consolidation of multiple second layer metadata blocks into a single second layer metadata block. In this manner, metadata back pointer generation process 10 may define a new location for at least one entry of a second layer metadata block. In some implementations, defragmenting 412 second layer metadata blocks may be in response to defragmenting third layer metadata blocks.

Figure 8:
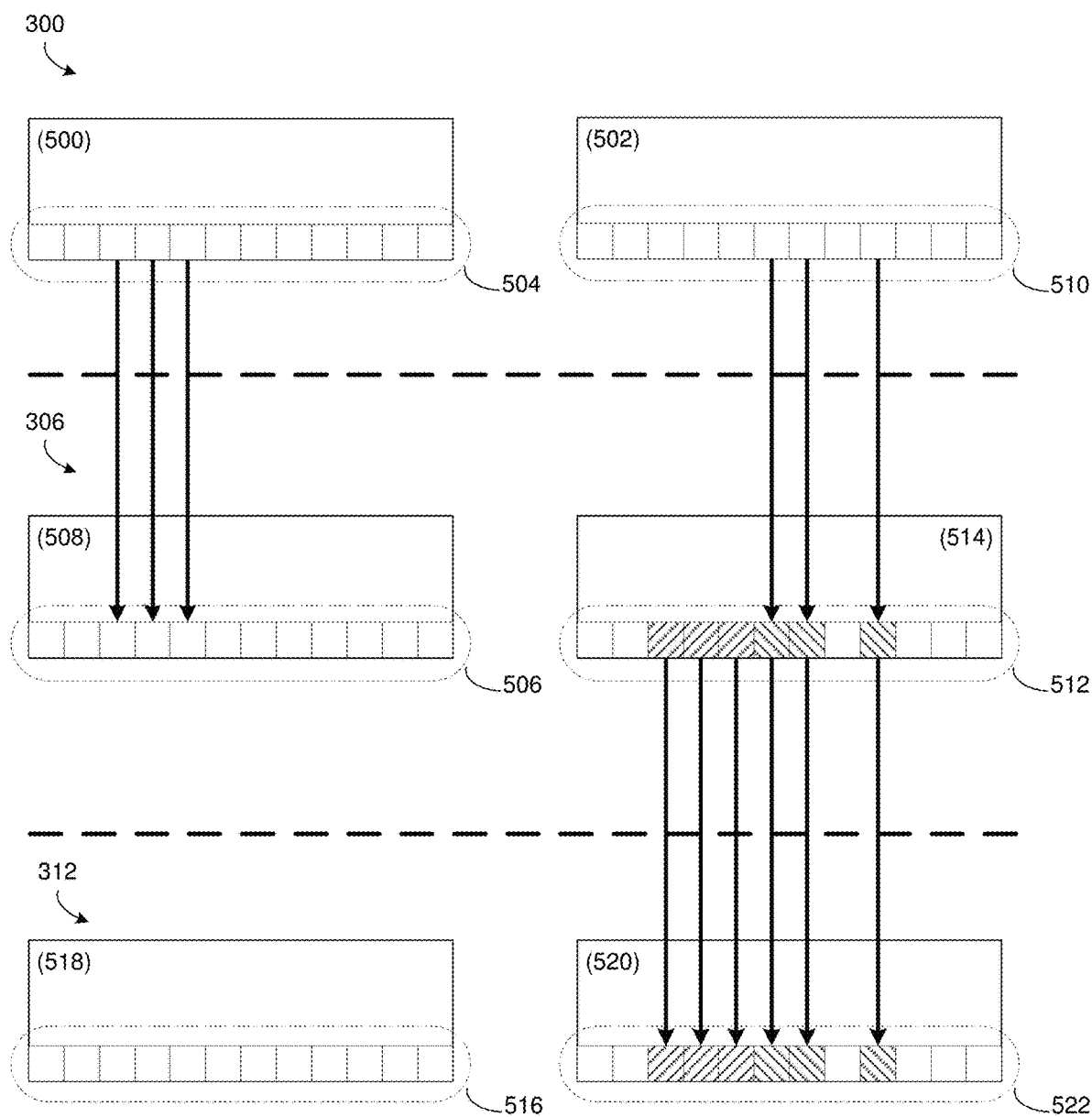
Figure 9:
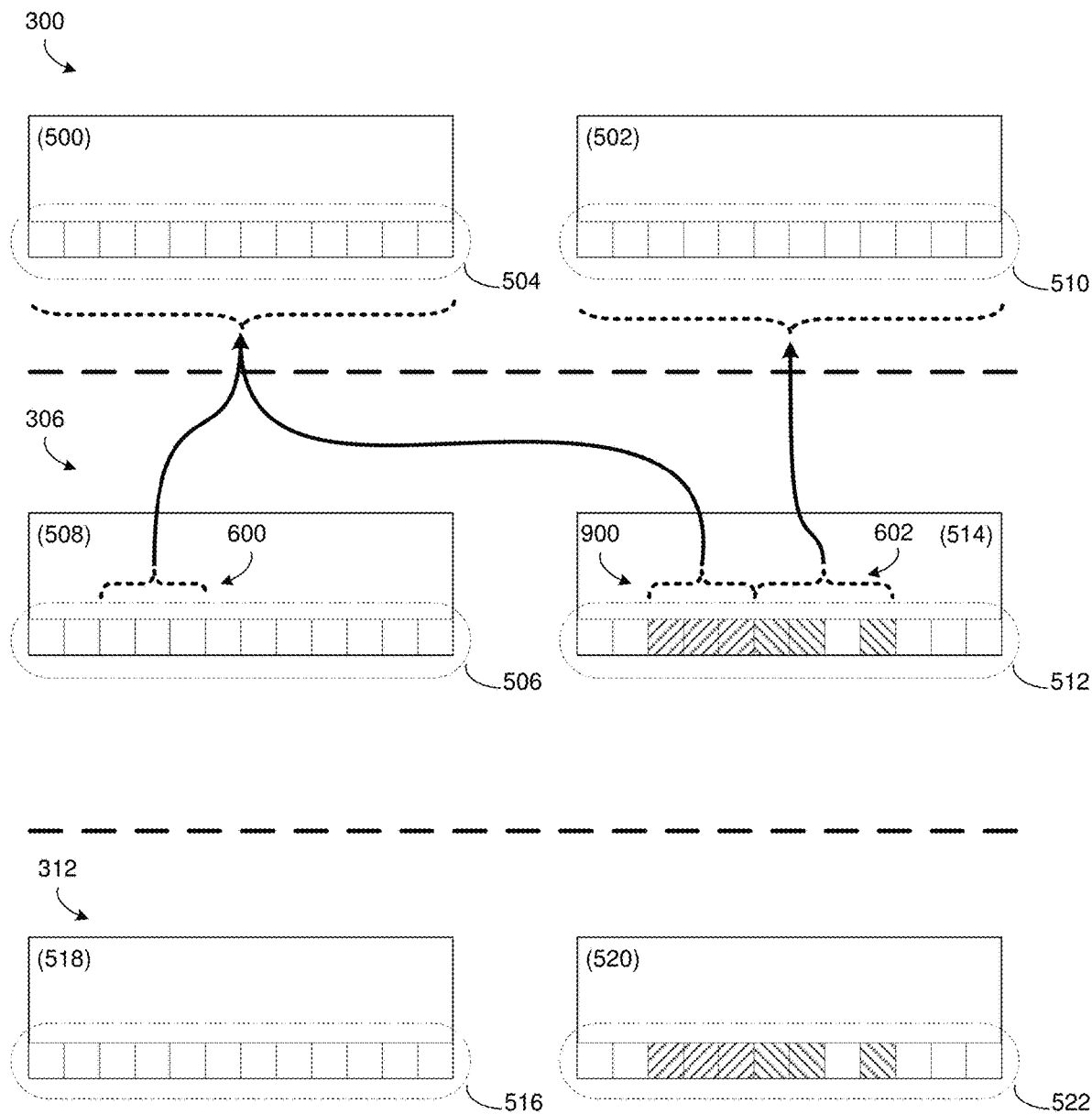

Referring also to the example of FIG. 8 and in some implementations, metadata back pointer generation process 10 may defragment 412 second layer metadata block 508 into second layer metadata block 514. While in this example, metadata back pointer generation process 10 is moving entries of second layer metadata block 508 into an existing second layer metadata block (e.g., second layer metadata block 514), metadata back pointer generation process 10 may move the subset of entries (e.g., subset of entries 600 as shown in FIG. 6) of second layer metadata block 508 into a new second layer block. Referring also to the example of FIG. 9 and as discussed above, metadata back pointer generation process 10 may generate 404 a common back pointer from the new subset of entries (e.g., entries 900) to first layer metadata block 500.

In some implementations and for each entry of the one or more entries of the first layer metadata block pointed to by a pointer of the plurality of pointers from the second layer metadata block, metadata back pointer generation process 10 may determine 414 if the entry of the first layer metadata block maps to the new location for the at least one entry of the second layer metadata block. Referring also to the example of FIG. 8 and in some implementations, metadata back pointer generation process 10 may determine 414 that one or more entries (e.g., entries 504) of first layer metadata block 500 map or point to one or more entries (e.g., entries 506) of second layer metadata block 508 and that one or more entries (e.g., entries 510) of first layer metadata block 502 map or point to one or more entries (e.g., entries 512) of second layer metadata block 514. In the example of FIG. 8, metadata back pointer generation process 10 may determine 414 that entries of first layer metadata block 500 do not map or point to the new location in second layer metadata block 508.

In some implementations and for each entry of the one or more entries of the first layer metadata block pointed to by a pointer of the plurality of pointers from the second layer metadata block, metadata back pointer generation process 10 may update 416 the entry of the first layer metadata to map to the new location of the at least one entry of the second layer metadata block if the entry of the first layer metadata block does not map to the new location for the at least one entry of the second layer metadata block.

Figure 10:
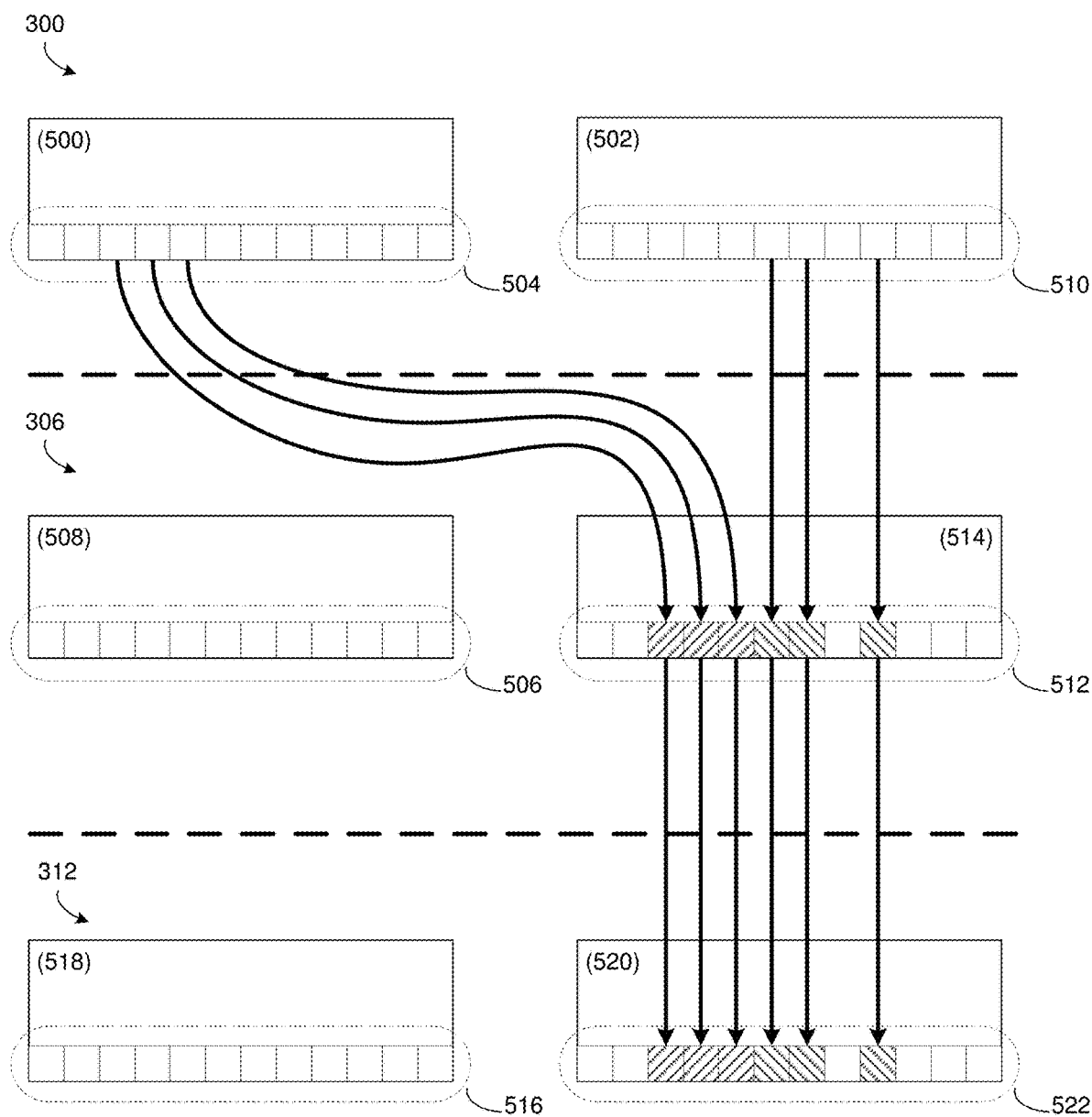

Returning to the example of FIG. 8 and in some implementations, metadata back pointer generation process 10 may determine 414 that entries of first layer metadata block 500 do not map or point to the new location in second layer metadata block 514. In this example, metadata back pointer generation process 10 may update 416 the entry of the first layer metadata to map to the new location of the at least one entry of the second layer metadata block if the entry of the first layer metadata block does not map to the new location for the at least one entry of the second layer metadata block. For example, metadata back pointer generation process 10 may update 416 the entries of first layer metadata 500 to map to the new location of the at least one entry of second layer metadata block 514 because the entries of the first layer metadata block do not map to the new location for the at least one entry of the second layer metadata block. As shown in FIG. 10, metadata back pointer generation process 10 may update 416 the entries of first layer metadata block 500 to map to the new location of the entries in second layer metadata block 514.

In some implementations and for each back pointer pointing from the one or more entries of the second layer metadata block, metadata back pointer generation process 10 may determine 418 if any of the one or more entries of the first layer metadata block and the one or more entries of the second layer metadata block point to each other. In some implementations and referring again to the example of FIGS. 9-10, metadata back pointer generation process 10 may determine 418 that one or more entries (e.g., entries 504) of first layer metadata block 500 points to the subset of entries (e.g., subset of entries 900) of second layer metadata block 508 and that one or more entries (e.g., entries 510) of first layer metadata block 502 points to the subset of entries (e.g., subset of entries 602) of second layer metadata block 514. Additionally, metadata back pointer generation process 10 may determine that subset of entries 600 of second layer metadata block 508 points to first layer metadata block 500; that subset of entries 900 of second layer metadata block 514 points to first layer metadata block 500; and that subset of entries 602 of second layer metadata block 514 points to first layer metadata block 502. Accordingly, metadata back pointer generation process 10 may determine that the entries (e.g., entries 510) of first layer metadata block 502 and the subset of entries 602 of second layer metadata block 514 point to each other; that the entries (e.g., entries 504) of first layer metadata block 500 and the subset of entries 900 of second layer metadata block 514 point to each other; and that entries (e.g., entries 504) of first layer metadata block 500 and the subset of entries 600 of second layer metadata block 508 do not point to each other.

Figure 11:
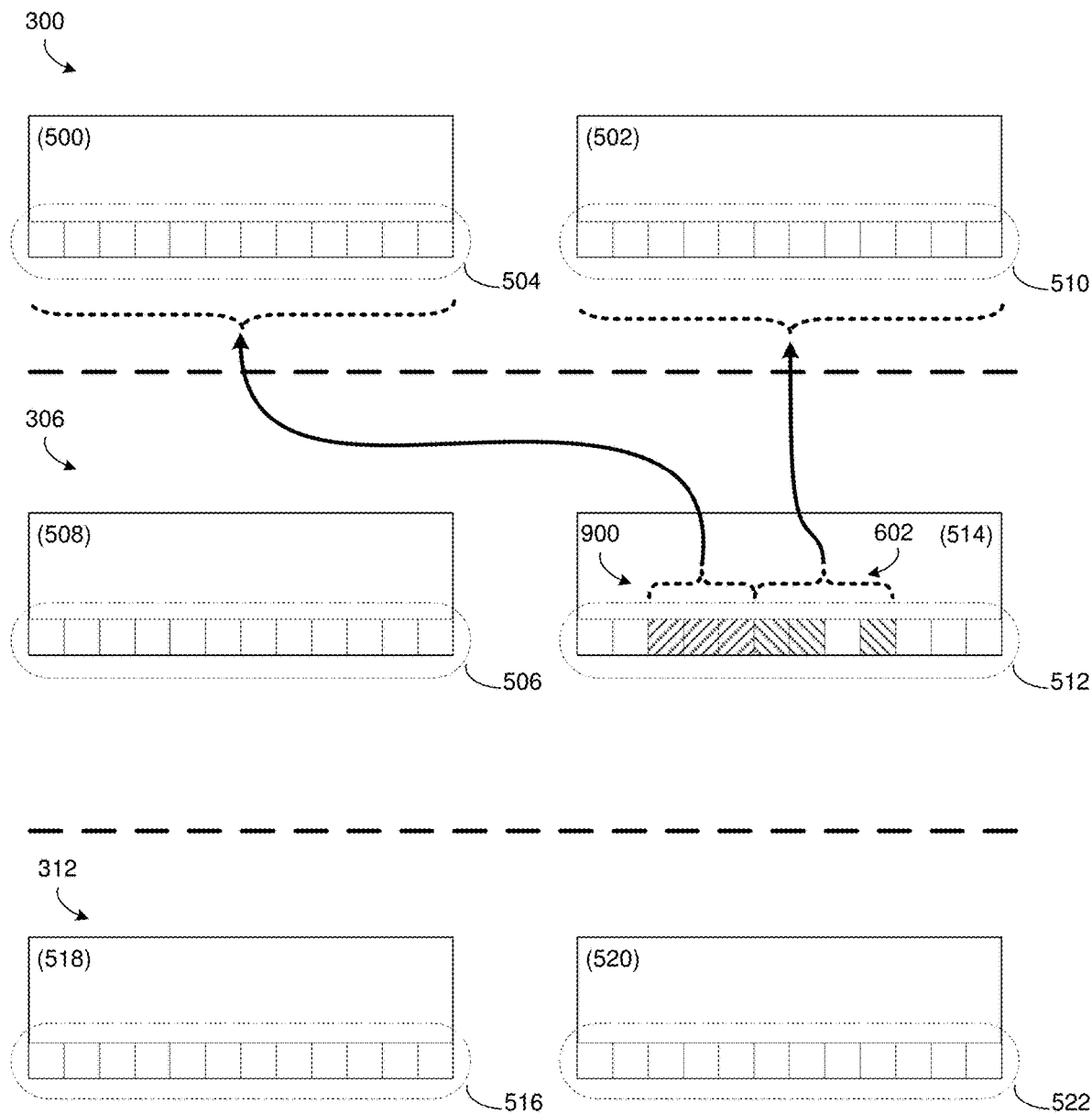

In some implementations and for each back pointer pointing from the one or more entries of the second layer metadata block, metadata back pointer generation process 10 may remove 420 the back pointer from the second layer metadata block if the entry of the first layer metadata block does not map to the one or more entries of the second layer metadata block. As discussed above and in some implementations, metadata back pointer generation process 10 may determine 418 that entries of first layer metadata block 500 and the subset of entries 600 of second layer metadata block 508 do not point to each other. Accordingly and as shown in the example of FIG. 11, metadata back pointer generation process 10 may remove 420 the common back pointer from subset of entries 600 of second layer metadata block 508.

GENERAL

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
identifying, via the computing device, one or more first layer metadata blocks with a plurality of entries mapping to a plurality of entries of one or more second layer metadata blocks;
identifying the one or more second layer metadata blocks mapped to by the one or more first layer metadata blocks;
generating a common back pointer for at least a subset of the plurality of entries of the one or more second layer metadata blocks, the common back pointer pointing from the at least a subset of the plurality of entries of the one or more second layer metadata blocks to the one or more first layer metadata blocks, wherein the subset of the plurality of entries of the one or more second layer metadata blocks includes at least two entries of the one or more second layer metadata blocks, wherein the common back pointer is a single pointer from the subset of the plurality of entries of the one or more second layer metadata blocks pointing to the one or more first layer metadata blocks;

defragmenting a second layer metadata block to define a new location for at least one entry of the second layer metadata block, such that the new location for the at least one entry of the second layer metadata block defines a new subset of entries of the plurality of entries of the one or more second layer metadata blocks; and generating a common block pointer from the new subset of entries of the plurality of entries of the one or more second layer metadata blocks.

2. The computer-implemented method of claim 1, wherein the plurality of entries of the one or more second layer metadata blocks map to a plurality of entries of one or more third layer metadata blocks and wherein the plurality of entries of the one or more third layer metadata blocks are configured to store user data.

3. The computer implemented method of claim 2, wherein generating the common back pointer is in response to adding new user data to the one or more third layer metadata blocks.

4. The computer-implemented method of claim 2, further comprising:
deleting one or more entries of the one or more third layer metadata blocks;
deleting one or more entries mapping to the one or more deleted entries of the one or more third layer metadata blocks from the at least a subset of the plurality of entries of the one or more second layer metadata blocks; and
retaining the common back pointer for the at least a subset of the plurality of entries of the one or more second layer metadata blocks.

5. The computer-implemented method of claim 1, wherein each entry of the plurality of entries of the one or more first layer metadata blocks is associated with a Logical Block Address (LBA) range.

6. The computer implemented method of claim 1, further comprising:
for each entry of the one or more entries of the first layer metadata block pointed to by a pointer from the one or more entries of the second layer metadata block:
determining if the entry of the first layer metadata block maps to the new location for the at least one entry of the second layer metadata block, and
if the entry of the first layer metadata block does not map to the new location for the at least one entry of the second layer metadata block, updating the entry of the first layer metadata to map to the new location of the at least one entry of the second layer metadata block; and
for each pointer pointing from the one or more entries of the second layer metadata block:
determining if any of the one or more entries of the first layer metadata block and the one or more entries of the second layer metadata block point to each other, and
removing a pointer from the second layer metadata block if none of the one or more entries of the first layer metadata block point to the one or more entries from which the pointer points from.

7. A computer program product residing on a non-transitory computer readable medium having a plurality of instructions stored thereon which, when executed by a processor, cause the processor to perform operations comprising:
identifying one or more first layer metadata blocks with a plurality of entries mapping to a plurality of entries of one or more second layer metadata blocks;
identifying the one or more second layer metadata blocks mapped to by the one or more first layer metadata blocks;
generating a common back pointer for at least a subset of the plurality of entries of the one or more second layer metadata blocks, the common back pointer pointing from the at least a subset of the plurality of entries of the one or more second layer metadata blocks to the one or more first layer metadata blocks, wherein the subset of the plurality of entries of the one or more second layer metadata blocks includes at least two entries of the one or more second layer metadata blocks, wherein the common back pointer is a single pointer from the subset of the plurality of entries of the one or more second layer metadata blocks pointing to the one or more first layer metadata blocks;
defragmenting a second layer metadata block to define a new location for at least one entry of the second layer metadata block, such that the new location for the at least one entry of the second layer metadata block defines a new subset of entries of the plurality of entries of the one or more second layer metadata blocks; and
generating a common block pointer from the new subset of entries of the plurality of entries of the one or more second layer metadata blocks.

8. The computer program product of claim 7, wherein the plurality of entries of the one or more second layer metadata blocks map to a plurality of entries of one or more third layer metadata blocks and wherein the plurality of entries of the one or more third layer metadata blocks are configured to store user data.

9. The computer program product of claim 8, wherein generating the common back pointer is in response to adding new user data to the one or more third layer metadata blocks.

10. The computer program product of claim 8, further comprising:
deleting one or more entries of the one or more third layer metadata blocks;
deleting one or more entries mapping to the one or more deleted entries of the one or more third layer metadata blocks from the at least a subset of the plurality of entries of the one or more second layer metadata blocks; and
retaining the common back pointer for the at least a subset of the plurality of entries of the one or more second layer metadata blocks.

11. The computer program product of claim 7, wherein each entry of the plurality of entries of the one or more first layer metadata blocks is associated with a Logical Block Address (LBA) range.

12. The computer program product of claim 9, further comprising:
for each entry of the one or more entries of the first layer metadata block pointed to by a pointer of a plurality of pointers from the one or more entries of the second layer metadata block:
determining if the entry of the first layer metadata block maps to the new location for the at least one entry of the second layer metadata block, and
if the entry of the first layer metadata block does not map to the new location for the at least one entry of the second layer metadata block, updating the entry of the first layer metadata to map to the new location of the at least one entry of the second layer metadata block; and
for each pointer pointing from the one or more entries of the second layer metadata block:

determining if any of the one or more entries of the first layer metadata block and the one or more entries of the second layer metadata block point to each other, and removing a pointer from the second layer metadata block if none of the one or more entries of the first layer metadata block point to the one or more entries from which the pointer points from.

13. A computing system including a processor and memory configured to perform operations comprising:

identifying one or more first layer metadata blocks with a plurality of entries mapping to a plurality of entries of one or more second layer metadata blocks;

identifying the one or more second layer metadata blocks mapped to by the one or more first layer metadata blocks;

generating a common back pointer for at least a subset of the plurality of entries of the one or more second layer metadata blocks, the common back pointer pointing from the at least a subset of the plurality of entries of the one or more second layer metadata blocks to the one or more first layer metadata blocks, wherein the subset of the plurality of entries of the one or more second layer metadata blocks includes at least two entries of the one or more second layer metadata blocks, wherein the common back pointer is a single pointer from the subset of the plurality of entries of the one or more second layer metadata blocks pointing to the one or more first layer metadata blocks;

defragmenting a second layer metadata block to define a new location for at least one entry of the second layer metadata block, such that the new location for the at least one entry of the second layer metadata block defines a new subset of entries of the plurality of entries of the one or more second layer metadata blocks; and generating a common block pointer from the new subset of entries of the plurality of entries of the one or more second layer metadata blocks.

14. The computing system of claim 13, wherein the plurality of entries of the one or more second layer metadata blocks map to a plurality of entries of one or more third layer metadata blocks and wherein the plurality of entries of the one or more third layer metadata blocks are configured to store user data.

15. The computing system of claim 14, wherein generating the common back pointer is in response to adding new user data to the one or more third layer metadata blocks.

16. The computing system of claim 14, further comprising:

deleting one or more entries of the one or more third layer metadata blocks;

deleting one or more entries mapping to the one or more deleted entries of the one or more third layer metadata blocks from the at least a subset of the plurality of entries of the one or more second layer metadata blocks; and retaining the common back pointer for the at least a subset of the plurality of entries of the one or more second layer metadata blocks.

17. The computing system of claim 13, wherein each entry of the plurality of entries of the one or more first layer metadata blocks is associated with a Logical Block Address (LBA) range.

18. The computer-implemented method of claim 1 further comprising:

determining that the plurality of entries of the one or more second layer metadata blocks do not include a common back pointer mapping to the one or more first layer metadata blocks.

* * * * *